Patented July 4, 1933

1,916,836

UNITED STATES PATENT OFFICE

HANS HAEUBER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF SHAPED ARTICLES FROM MASSES CONTAINING SILICON

No Drawing. Application filed December 14, 1931, Serial No. 581,079, and in Germany December 22, 1930.

The present invention relates to improvements in the production of shaped articles from masses containing silicon.

The strength of the usual masses prepared from metallic silicon, i. e. silicon in the free elementary state or in the form of silicon alloys or silicides or mixtures thereof, or masses containing the same, and a binding agent, which in suitable shape, such as plates, may be used as acid-proof linings or for other purposes, may be increased by heating the masses at very high temperatures, as for example at about 1200° C. to glowing. Since on the one hand the masses (crude articles) do not possess sufficient strength before the said heating to glowing to enable them to be worked mechanically to any great extent, and on the other hand the glowed articles possess such a hardness that they resist working even with the best tools, it has only been possible hitherto to prepare shaped articles such as are obtainable by pressing the initial masses before the glowing. As binding agents may be employed ceramic materials, i. e. materials usual in the ceramic and glass industries, as for example natural silicates, such as clay, kaolin, feldspar, steatite or quartz or artificial products, such as frits, all sorts of glasses, molten quartz, cements and several oxides, such as zirconium oxide, alumina with or without additions of silicates of earth alkaline metals, or the like, or mixtures of any of the aforesaid materials. By "working mechanically" is to be understood in the present application any cutting, chipping, splitting, boring, punching or rasping operation to obtain the desired shape or finish, with tools such as lathes, files, saws, chisels or mallet and chisel, or with grinding materials such as carborundum powder, alundum powder or emery powder, i. e. all mechanical operations in which, in order to obtain a desired shape, part of the body of crude mass larger than this shape is mechanically removed.

I have now found that the said difficulties are obviated so that any desired shaped articles may be prepared from the crude articles with the usual tools or means according to the methods usual in working up metals, by heating crude articles comprising metallic silicon and one or more ceramic materials of which at least one sinters below 1000° C. before the mechanical working to temperatures above the sintering or melting point of the ceramic material sintering below 1000° C. but below 1000° C. until they acquire the hardness necessary for working, the glowing process proper at temperatures above 1000° C. and up to near the melting point of the metallic silicon present in the free elementary state or in the form of alloys or silicides not being carried out until after the mechanical working. For example the preheating may take place at about 900° C. and the glowing at about 1200° C.

In the said crude articles comprising metallic silicon and ceramic matter the ceramic matter is usually present in an amount between 2 and 70 per cent with reference to the whole mass. The time required for heating at a temperature above the sintering point of the ceramic matter but below 1000° C. depends on the size of the treated articles. With bigger articles a longer duration of heating is required than with smaller articles. Usually the heating is carried on until the articles are thoroughly ignited which ordinarily last 2 to 4 hours.

The heating to a temperature below 1000° C. and the glowing operation proper is carried out in the manner usual in the ceramic industry, i. e. by burning by direct contact with a flame.

The materials prepared according to the present invention may be employed for a great variety of purposes for which silicon or masses containing the same in the free elementary or alloyed state has proved of advantage, in particular as constructional materials for vessels to be used for chemical conversions, at elevated temperatures, of different hydrocarbons, as for example for cracking oils in the liquid or vaporous phase or for distilling oils, for cracking gaseous hydrocarbons of the methane series, for the condensation of methane or its gaseous homologues or of olefines to form liquid hydrocarbons, or for producing hydrogen by the interaction of methane and steam or for similar processes.

The said materials may also be employed as filling materials in Cowpers. They are employed with particular advantage for the construction of single devices necessary in apparatus suitable for carrying out the said heat-treatments, as for example for the construction of communication pieces, of closing devices of covers and the like.

The shaped articles prepared in the said manner are suitable in particular as constructional materials for apparatus which is to be stable to heat or corrosion or both. They are of particular advantage for constructing apparatus in which thermal conversion of hydrocarbons is to take place, as for example the production of aromatic hydrocarbons from aliphatic hydrocarbons by heating to temperatures above 500° C. or the production of olefines by dehydrogenation or cracking of paraffinic hydrocarbons.

It has been found that the stability to heat and corrosion of the resulting shaped articles is not dependent on the degree of purity of the silicon employed. For example masses may be worked up which contain, instead of commercial silicon (iron content from 8 to 10 per cent), a silicon having a higher metal content, especially a higher iron content. The silicon may even be wholly or partly replaced by silicides, such as silicon carbide or alloys of silicon with metals, such as iron. Cementing masses, as for example mixtures of pulverulent silica, in a modification readily reacting with alkali, with water glass solutions, and if desired also containing clay or sulphates of the alkaline earth metals, may also be added, without the shaped articles prepared in the said manner losing their capability of being employed as constructional materials for the said purposes.

The following example will further illustrate the nature of this invention but the invention is not restricted to this example.

*Example*

60 parts by weight of commercial free elementary silicon powder containing about 90 per cent of silicon, 20 parts by weight of clay, 15 parts by weight of sodium potassium silicate and 5 parts by weight of a mixture of sodium chloride and potassium chloride are stirred up with such an amount of water that a plastic mass mouldable by pressing is obtained. Pieces of suitable shape are moulded from the said mass, for example by hydraulic pressing and these are dried by exposure to air. They are then heated for about 3 hours in a ceramic furnace to temperatures of between about 900° and 950° C. and are thus preliminarily hardened. On cooling, the said heated pieces can be worked mechanically for example by turning or boring on the lathe and tubes and the like can thus be formed. The masses thus worked are then subjected to a finishing heating at temperatures of between about 1200° and 1250° C.

If in the above example the free elementary silicon is replaced by a silicide, such as silicon carbide or by an alloy of silicon, for example with copper, chromium or iron the procedure may be carried through in the same way with similar results. The same is true if the mixture of clay, potassium silicate and alkali metal chlorides is replaced by another of the aforementioned ceramic materials.

What I claim is:—

A process for the production of shaped masses from metallic silicon which comprises mixing metallic silicon with a ceramic material sintering below 1000° C., heating the mixture obtained to a temperature above the sintering temperature of said ceramic material but below 1000° C., imparting to the obtained mass the desired shape by a mechanical operation and heating the shaped mass to a temperature between 1000° C. and the melting point of the metallic silicon contained therein.

In testimony whereof I have hereunto set my hand.

HANS HAEUBER.